United States Patent
Waidmann et al.

(10) Patent No.: US 8,922,453 B2
(45) Date of Patent: Dec. 30, 2014

(54) VARIABLE ADAPTION OF ACTIVE ANTENNA SYSTEM RADIO FREQUENCY FILTERING

(75) Inventors: Stephan Waidmann, Laichingen (DE); Elmar Guha, Ulm (DE)

(73) Assignee: Nokia Solutions and Networks Oy, Espoo (FI)

( * ) Notice: Subject to any disclaimer, the term of this patent is extended or adjusted under 35 U.S.C. 154(b) by 252 days.

(21) Appl. No.: 13/557,648

(22) Filed: Jul. 25, 2012

(65) Prior Publication Data

US 2014/0028529 A1    Jan. 30, 2014

(51) Int. Cl.
  *H01Q 1/24*    (2006.01)

(52) U.S. Cl.
  CPC .............. *H01Q 1/246* (2013.01); *H01Q 1/243* (2013.01)
  USPC .......................................... 343/904; 343/702

(58) Field of Classification Search
  CPC ......... H01Q 1/246; H01Q 1/243; H04B 1/03; H04B 1/08; H04B 1/38
  USPC ................. 343/700 MS, 702, 841, 872, 904; 333/202
  See application file for complete search history.

(56) References Cited

U.S. PATENT DOCUMENTS

| | | | | |
|---|---|---|---|---|
| 5,400,039 A | * | 3/1995 | Araki et al. | 343/700 MS |
| 5,512,901 A | * | 4/1996 | Chen et al. | 342/175 |
| 5,777,856 A | * | 7/1998 | Phillips et al. | 361/816 |
| 6,005,455 A | * | 12/1999 | Lindell et al. | 333/134 |
| 6,329,949 B1 | * | 12/2001 | Barnett et al. | 343/700 MS |
| 7,009,564 B2 | * | 3/2006 | Ryken et al. | 343/700 MS |
| 7,043,280 B1 | | 5/2006 | Shields et al. | |

FOREIGN PATENT DOCUMENTS

| | | |
|---|---|---|
| EP | 1 133 064 A1 | 9/2001 |
| WO | 2004/097987 A1 | 11/2004 |

OTHER PUBLICATIONS

International Search Report and Written Opinion international application No. PCT/EP2013/065148 dated Oct. 30, 2013.

* cited by examiner

*Primary Examiner* — Hoanganh Le
(74) *Attorney, Agent, or Firm* — Squire Patton Boggs (US) LLP

(57) ABSTRACT

Antenna systems, such as an active antenna system (AAS), can include active and passive electronic components located closely together inside an antenna system. Such systems may benefit from variable adaptation of active antenna system radio frequency signal filtering. An apparatus can include an active part on a first end of a signal path within a sealed enclosure. The apparatus can also include a radiator part on a second end of the signal path within the sealed enclosure. The apparatus can further include an intermediate part, which includes at least one of an additional filter part or a customized passive part, positioned between the active part and the radiator part along the signal path between the first signal side and the second signal side.

17 Claims, 5 Drawing Sheets

VARIABLE ADAPTION OF ACTIVE ANTENNA SYSTEM RADIO FREQUENCY FILTERING

BACKGROUND

1. Field

Antenna systems, such as an active antenna system (AAS), can include active and passive electronic components located closely together inside an antenna system. Such systems may benefit from variable adaptation of active antenna system radio frequency signal filtering.

2. Description of the Related Art

International Telecommunication Union (ITU) requirements describe only worldwide applicable requirements in respect of radio emission. Radio system specific requirements are described by other organizations, such as the 3rd Generation Partnership Program (3GPP). Radio system specific requirements can include long term evolution (LTE), wideband code division multiple access (WCDMA), global system for mobile communication (GSM), and the like. National specific requirements can also be added on to those requirements. For example, the British telecom regulator, Ofcom, has released additional radio requirements for co-location of mobile communication with national Digital Terrestrial Television (DTT) services. For other countries, like the United States, Germany, and so on, other additional requirements may likewise be defined.

In an active antenna system (AAS), variable RF filtering/RF combining may be used. AAS is a system architecture introduced in mobile radio communication. It can be viewed as an evolution from previous base transceiver station (BTS) design, for example remote radio head (RRH). Within RRH design, antenna and active part/passive part are not inseparably connected. Thus, an additional filter part can be easily placed.

FIG. 1 illustrates additional filtering in case of a remote radio head (RRH). As shown in FIG. 1, the remote radio head can include an active part/passive part 120 inside sealed outside enclosure 110. The sealed outside enclosure 110 can include inputs and outputs, such as a supply voltage 130, a data line with data to be transmitted 140, a data line with data received 150, and a control line 160 for control of the RRH. As used herein, the term "sealed" can refer to sealing in terms of ingress protection (IP), electromagnetic compatibility (EMC), not with respect to any desired radio frequency (RF) signals.

The remote radio head active part/passive part 120 can include, for example, baseband processing, up-/downconversion, filtering, radio frequency (RF) power amplification, low noise reception (RX) amplifier, and RF filtering, such as a diplex filter.

Also included can be an additional filter part 170 placed between the active part/passive part 120 and an antenna 180. The additional filter part 170 can include, for example, a bandpass/notch/lowpass filter. The additional filter part 170 can be connected to the active part/passive part 120 by an interface 190.

FIG. 2 illustrates an adaptive antenna system (AAS) setup. As shown in FIG. 2, the AAS can include a combination of an antenna radiator 220 and an active part/passive part 120. These elements can be combined in a compact way. However, as a result, an additional filter part cannot be inserted as in a conventional BTS design. For example, any additional filter part cannot be placed after the AAS itself, since the antennas are already an integral part of the AAS.

The AAS can include the active part/passive part 120 and the radiator part 220 inside sealed outside enclosure 110. The sealed outside enclosure 110 can include inputs and outputs, such as a supply voltage 130, a data line with data to be transmitted 140, a data line with data received 150, and a control line 260 for control of the AAS.

The active part/passive part 120 can include, for example, baseband processing, up-/downconversion, filtering, RF power amplification, a low noise RX amplifier, and RF filtering, such as a diplex filter or a triplex filter to inject another passive signal.

The radiator part 220 can include, for example, a passive antenna distribution network, an antenna matching network, and/or antenna radiation elements. Thus, the radiator part 220 can directly provide an external radio signal 225 without the need for any additional interface.

While the design is compact, in the above mentioned example, several different products may need to be designed and built for several different operators in one country. Moreover, different products may also be needed on a country-by-country basis.

FIG. 2 should be understood as not implying that there is a physical boundary between active part/passive part 120 and radiator part 220. Likewise, the drawing should not be understood as implying that subparts of each schematic section are physically arranged in the way shown. Subparts, as discussed herein, can refer to parts made of one or more elements to achieve a certain function.

SUMMARY

An apparatus, according to certain embodiments, includes an active part on a first end of a signal path within a sealed enclosure. The apparatus also includes a radiator part on a second end of the signal path within the sealed enclosure. The apparatus further includes an intermediate part, comprising at least one of an additional filter part or a customized passive part, positioned between the active part and the radiator part along the signal path between the first signal side and the second signal side.

According to certain embodiment, an apparatus includes active means for actively processing radio communications on a first end of a signal path within a sealed enclosure. The apparatus also includes radiation means for transmitting the radio communications on a second end of the signal path within the sealed enclosure. The apparatus further includes intermediate means for processing the radio communications, comprising at least one of an additional filtering means for additionally filtering the radio communications, or customized passive means for passively processing the radio communications, positioned between the active means and the radiation means along the signal path between the first signal side and the second signal side.

In certain embodiments, a method of manufacturing an apparatus includes providing an active part on a first end of a signal path of an enclosure. The method also includes providing a radiator part on a second end of the signal path within the enclosure. The method further includes inserting an intermediate part, comprising at least one of an additional filter part or a customized passive part, between the active part and the radiator part along the signal path between the first signal side and the second signal side.

BRIEF DESCRIPTION OF THE DRAWINGS

For proper understanding of the invention, reference should be made to the accompanying drawings, wherein.

DETAILED DESCRIPTION

An active antenna system (AAS) can include active and passive electronic components located closely together inside an antenna system. Inside an AAS, signal conditioning can be done, for example, via filtering, up-/downconversion, and combining. Some performance parameters of AAS include reception parameters, such as receive sensitivity and signal receive quality, and transmission parameters, such as transmit power and signal transmit quality.

Subparts of an AAS can be located very close together. Such subparts can include a low noise amplifier, a power amplifier, a radio frequency (RF) filter, and an RF combiner. Environmental parameters, such as radiated emissions or ingress protection sealing (IP seal), can also favor a compact design.

Figure 1:
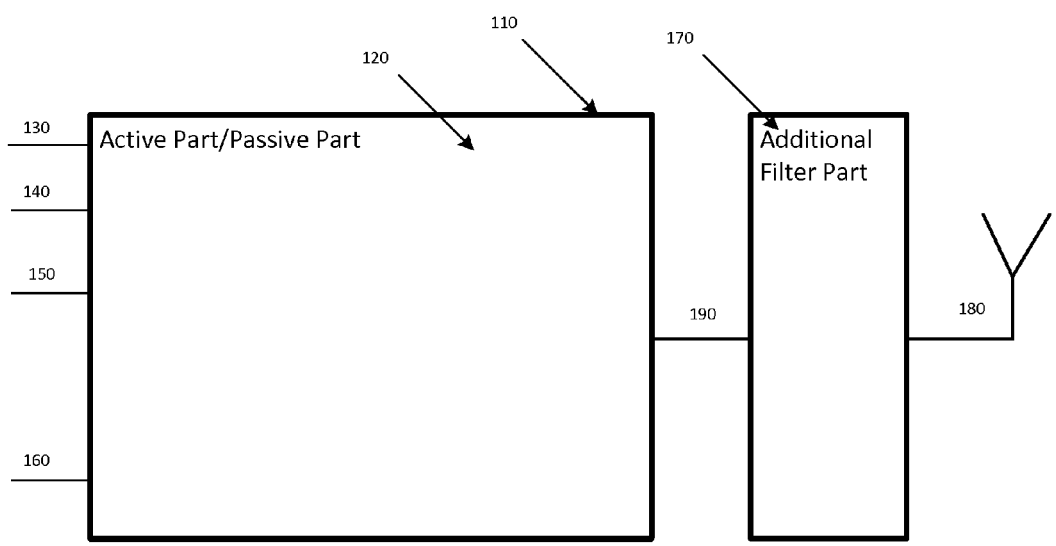
FIG. 1 illustrates additional filtering in case of a remote radio head (RRH).
Figure 2:
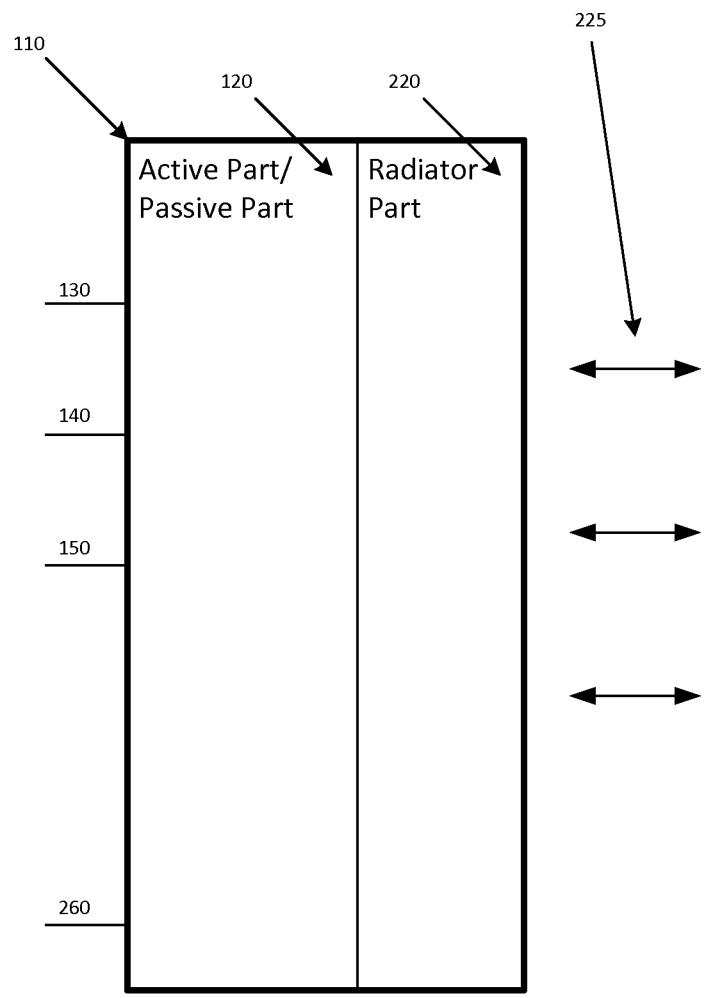
FIG. 2 illustrates an adaptive antenna system (AAS) setup.
Figure 3:
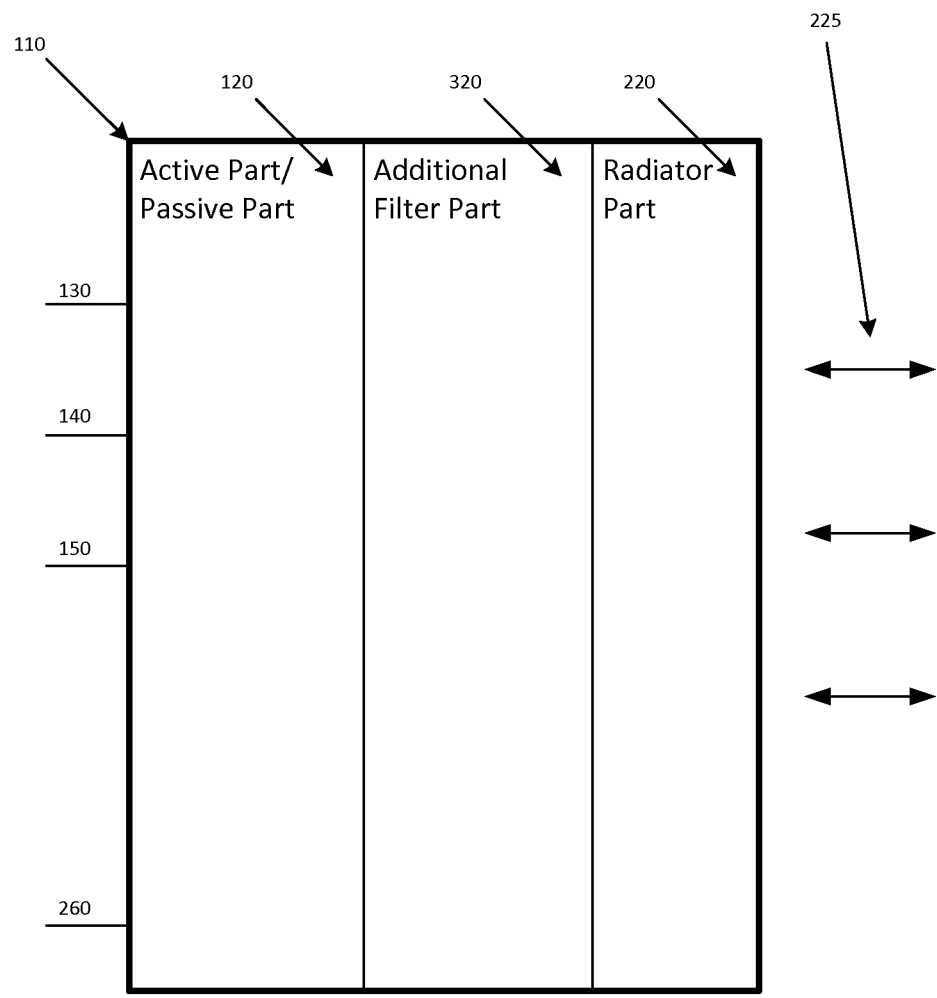
FIG. 3 illustrates an arrangement for an AAS, according to certain embodiments.

FIG. 3 illustrates an arrangement for an AAS, according to certain embodiments. Various physical arrangements of the subparts are possible. The AAS may have certain subparts, such as those described with reference to FIG. 2, which may serve as a global foundation without respect to local or operator requirements.

The radiator part 220 can further be separated from the active part/passive part 120 and an additional filter part 320 can be inserted between them. This additional filter part 320 can assist with meeting local requirements. Thus, all three parts can comply with world market requirements and local requirements in sum. For additional local requirements, the additional filter part can be exchanged for another one. The additional filter part 320 can include, for example, additional RF signal conditioning, such as a bandpass/notch/lowpass filter.

Each individual active part/passive part 120, additional filter part 320, and radiator part 220 do not need to be fully sealed on an individual basis. Instead, the combination of all sections can be fully sealed, for example for the purposes of IP seal, electromagnetic compatibility (EMC), or the like. Thus, FIG. 3 should not be understood as implying that there is a physical boundary, such as a wall, between parts.

In certain embodiments, the active part/passive part and radiator part can stay the same for the worldwide market and local market. For country specific adaption, an additional filter part can be placed, without other modifications, between the other two parts. Proper mechanical construction can, therefore, permit easy specific adaption.

Moreover, certain embodiments can permit re-use of existing hardware. There may be higher production volumes for reused parts. Likewise, there may be a decreased effort involved in testing different variants.

Figure 4:
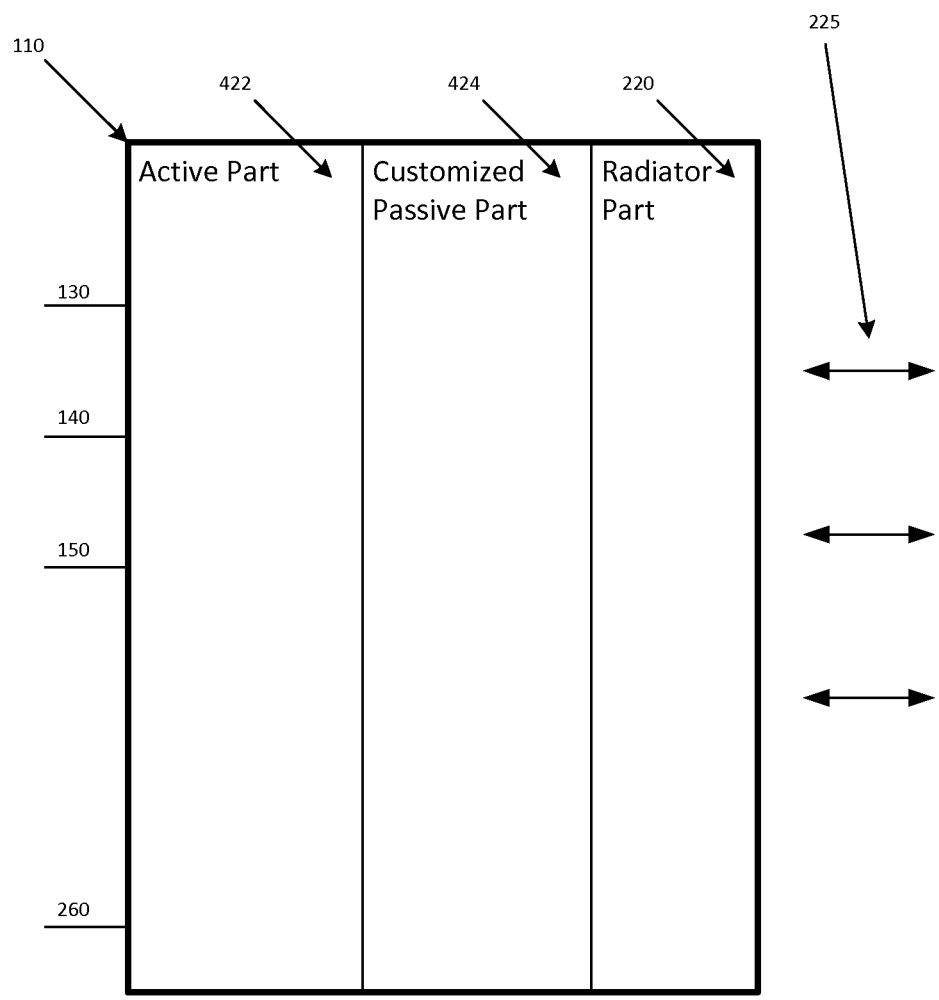
FIG. 4 illustrates another arrangement for an AAS, according to certain embodiments.

FIG. 4 illustrates another arrangement for an AAS, according to certain embodiments. Various physical arrangements of the subparts are possible. The AAS may have certain subparts, such as those described with reference to FIG. 2, which may serve as a global foundation without respect to local or operator requirements.

In this embodiment, rather than having an active part/passive part, an active part 422 is provided and a passive part is provided as a customized passive part 424. The active part 422 can be the same globally, whereas the customized passive part 424 can be customized to local requirements.

Thus, the active part 422 can include, for example, baseband processing, up-/downconversion, filtering, RF power amplification, and a low noise RX amplifier. On the other hand, customized passive part 424 can include RF filtering, such as a diplex filter or a triplex filter to inject another passive signal, and it can be country/operator/customer specific.

Each individual active part 422, customized passive part 424, and radiator part 220 do not need to be fully sealed on an individual basis. Instead, the combination of all sections can be fully sealed, for example for the purposes of IP seal, EMC, or the like. Thus, FIG. 4 should not be understood as implying that there is a physical boundary, such as a wall, between parts.

Certain embodiments can have a physical arrangement of subparts that corresponds to and is the same the arrangement for logical parts. Moreover, in certain embodiments a mechanical interface is configured to allow insertion of the additional filter part/customized passive part, to achieve a sealed outside enclosure). Certain embodiments may also provide and be configured to operate with a definition of a radio interconnection interface for assembly.

Moreover, certain embodiments may provide high flexibility for rapidly changing customer requirements. Additionally, embodiments in which all or a substantial portion of the passive elements are provided in a customized passive part may provide a lower impact on performance compared to embodiments in which part of the passive components are together with the active part. The lower impact may be seen in terms of RF insertion loss and/or RF intermodulation problems. This lower impact may lead to better RX and TX signal quality. Moreover, such embodiments may provide a more highly integrated passive part, which may lead to reductions in weight, cost, and/or size of the AAS.

Certain embodiments can be applied to various use cases. For example, customer specific requirements/national specific requirements may often change rapidly. Certain embodiments, therefore, can provide flexibility for implementation of changes. Moreover, a low cost passive part variant for worldwide market can provided, with a higher cost additional filter part for local market customizations. Many co-location scenarios are possible. The architecture according to certain embodiments can offer the possibility to upgrade deployed hardware in case of new requirements.

Figure 5:
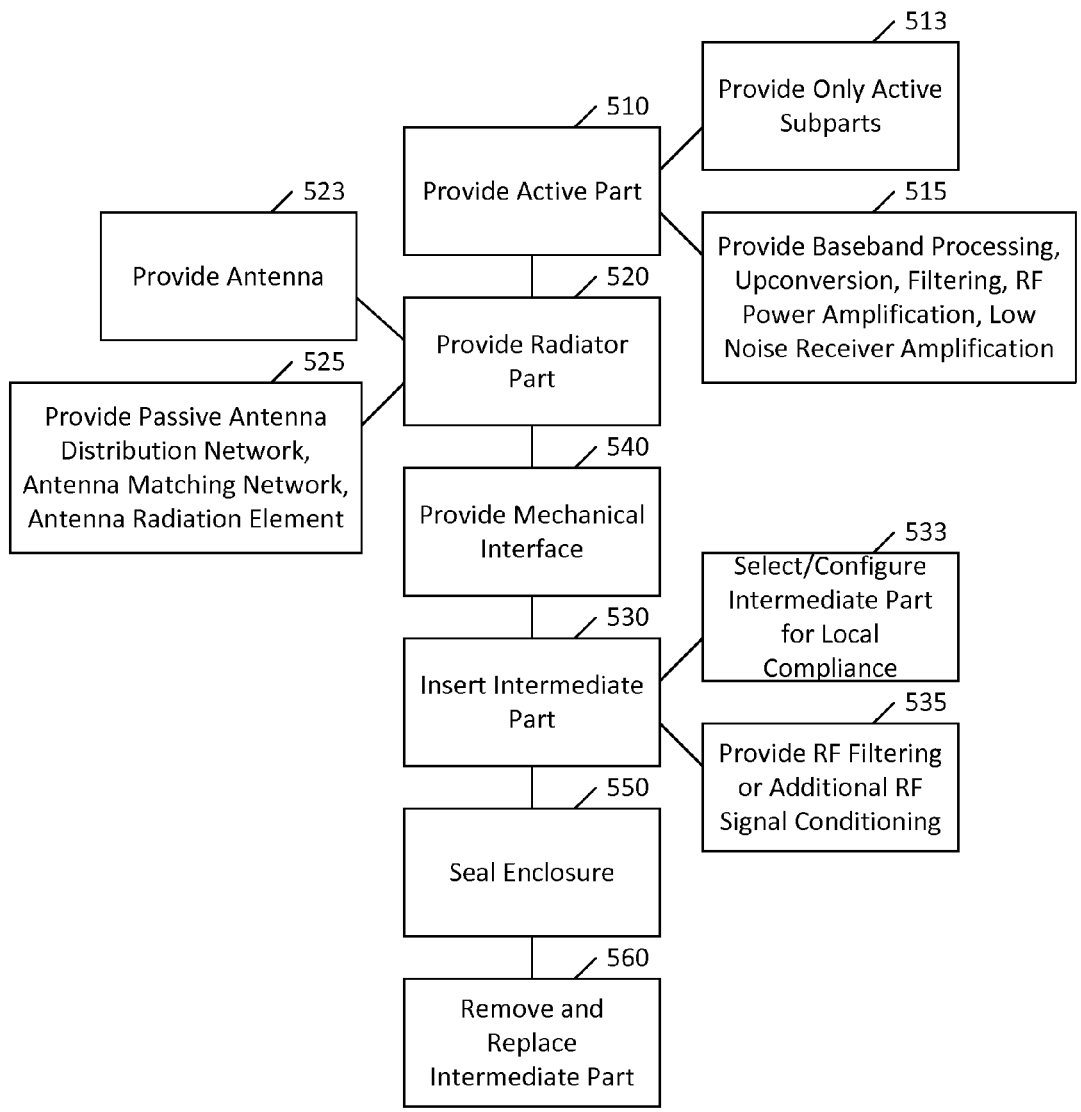
FIG. 5 illustrates a method of manufacturing an apparatus, according to certain embodiments.

FIG. 5 illustrates a method of manufacturing an apparatus, according to certain embodiments. The method can include, at 510, providing an active part on a first end of a signal path of an enclosure. The method can also include, at 520, providing a radiator part on a second end of the signal path within the enclosure. The method can further include, at 530, inserting an intermediate part, comprising at least one of an additional filter part or a customized passive part, between the active part and the radiator part along the signal path between the first signal side and the second signal side.

The method can additionally include, at 540, providing a mechanical interface in the apparatus configured to permit insertion of the intermediate part. Moreover, the method can include, at 550, sealing the enclosure, at least in part, by inserting the intermediate part into the mechanical interface. Furthermore, the method can include, at 560, removing and replacing the intermediate part using the mechanical interface.

The method can include, at 513, providing only active subparts in the active part. Moreover, the method can include, at 515, providing, in the active part, at least one of baseband processing, up-/downconversion, filtering, radio frequency power amplification, or a low noise receiver amplifier.

The method can also include, at 523, providing an antenna in the radiator part. The method can further include, at 525, providing, in the radiator part, at least one of a passive antenna distribution network, an antenna matching network, or an antenna radiation element.

The method can additionally include, at 533, selecting or configuring the intermediate part to make the apparatus comply with local communication standards. The method can also include, at 535, providing, in the intermediate part, at least one of radio frequency filtering or additional radio frequency signal conditioning.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

GLOSSARY

AAS: Active Antenna System
RX: Receiver
TX: Transmitter
RF: Radio Frequency
ITU: International Telecommunication Union
3GPP: 3rd Generation Partnership Program
GSM: Global System for Mobile Communication
LTE: Long term Evolution
WCDMA: Wideband Code Division Multiple Access
DTT: Digital Terrestrial Television
IP seal: Ingress Protection
Ofcom, Office of Communications, the British telecom regulator
RRH: Remote Radio Head
BTS: Base Transceiver Station
ODM: Original Design Manufacturer

We claim:

1. An apparatus, comprising:
an active part on a first end of a signal path within a sealed enclosure;
a radiator part on a second end of the signal path within the sealed enclosure; and
an intermediate part, comprising at least one of an additional filter part or a customized passive part, positioned between the active part and the radiator part along the signal path between the first signal side and the second signal side,
wherein the intermediate part is configured to be removable.

2. The apparatus of claim 1, further comprising:
a mechanical interface configured to permit insertion of the intermediate part.

3. The apparatus of claim 2, wherein the sealed enclosure is sealed, at least in part, by insertion of the intermediate part to the mechanical interface.

4. The apparatus of claim 1, wherein the active part includes only active subparts.

5. The apparatus of claim 1, wherein the intermediate part is configured to make the apparatus comply with local communication standards or special customer requirements.

6. The apparatus of claim 1, wherein the radiator part comprises an antenna.

7. The apparatus of claim 1, wherein the active part comprises at least one of baseband processing, up-/downconversion, filtering, radio frequency power amplification, or a low noise receiver amplifier.

8. The apparatus of claim 1, wherein the intermediate part comprises at least one of radio frequency filtering or additional radio frequency signal conditioning 9. The apparatus of claim 1, wherein the radiator part comprises at least one of a passive antenna distribution network, an antenna matching network, or an antenna radiation element.

10. A method of manufacturing an apparatus, the method comprising:
providing an active part on a first end of a signal path of an enclosure;
providing a radiator part on a second end of the signal path within the enclosure;
providing a mechanical interface in the apparatus configured to permit insertion of an intermediate part;
inserting the intermediate part, comprising at least one of an additional filter part or a customized passive part, between the active part and the radiator part along the signal path between the first signal side and the second signal side; and
removing and replacing the intermediate part using the mechanical interface.

11. The method of claim 10, further comprising:
sealing the enclosure, at least in part, by inserting the intermediate part into the mechanical interface.

12. The method of claim 10, further comprising:
providing only active subparts in the active part.

13. The method of claim 10, further comprising:
selecting or configuring the intermediate part to make the apparatus comply with local communication standards or special customer requirements.

14. The method of claim 10, further comprising:
providing an antenna in the radiator part.

15. The method of claim 10, further comprising:
providing, in the active part, at least one of baseband processing, up-/downconversion, filtering, radio frequency power amplification, or a low noise receiver amplifier.

16. The method of claim 10, further comprising:
providing, in the intermediate part, at least one of radio frequency filtering or additional radio frequency signal conditioning.

17. The method of claim 10, further comprising:
providing, in the radiator part, at least one of a passive antenna distribution network, an antenna matching network, or an antenna radiation element.

* * * * *